United States Patent [19]

Huggler et al.

[11] Patent Number: 5,385,082
[45] Date of Patent: Jan. 31, 1995

[54] TOASTER WITH SAFETY SHUT-OFF
[75] Inventors: Peter Huggler, Columbia; Charles Martin, Macon, both of Mo.
[73] Assignee: Toastmaster Inc., Columbia, Mo.
[21] Appl. No.: 225,046
[22] Filed: Apr. 8, 1994
[51] Int. Cl.⁶ .......................... A47J 37/08; H05B 1/02
[52] U.S. Cl. ..................................... 99/328; 99/329 P; 99/329 RT; 99/333; 99/338; 99/385; 99/389; 219/489; 219/492
[58] Field of Search ................................. 99/325–328, 99/329 R, 329 RT, 329 P, 331–333, 334, 335, 337, 338, 385, 389–392, 393–399; 219/386, 412, 464, 492, 501, 514, 519, 489

[56] References Cited

U.S. PATENT DOCUMENTS

| | | |
|---|---|---|
| 2,251,925 | 8/1941 | Edmunds et al. . |
| 2,330,644 | 9/1943 | Uhlrig . |
| 2,621,583 | 12/1952 | Victor . |
| 2,621,584 | 12/1952 | Palmer ........................ 99/328 |
| 2,631,523 | 3/1953 | Olving . |
| 2,631,524 | 3/1953 | Theisen . |
| 2,638,164 | 5/1953 | Victor . |
| 2,734,448 | 2/1956 | McCullough ................ 99/328 |
| 2,739,523 | 3/1656 | McCullough ................ 99/328 |
| 2,878,748 | 3/1959 | Stanek ......................... 99/328 |
| 2,879,707 | 3/1959 | Ambrose ...................... 99/328 |
| 2,913,976 | 11/1959 | Cole . |
| 3,086,623 | 4/1963 | Cole . |
| 3,129,649 | 4/1964 | Visos ........................ 99/329 P |
| 3,129,651 | 4/1964 | Visos ........................ 99/329 P |
| 3,129,652 | 4/1964 | Kueser ...................... 99/329 P |
| 3,291,968 | 12/1966 | Snyder ........................ 219/489 |
| 3,392,663 | 7/1968 | Williams . |
| 3,483,318 | 4/1969 | Williams . |
| 3,869,970 | 3/1975 | Eagle . |
| 4,092,520 | 5/1978 | Holmes et al. . |
| 4,154,151 | 5/1979 | Mochizuki ................ 99/329 R |
| 4,188,865 | 2/1980 | Bjarsch . |
| 4,217,482 | 8/1980 | Wadia . |
| 4,345,513 | 2/1981 | Holt . |
| 4,395,621 | 7/1983 | Parker . |
| 4,687,906 | 8/1987 | Fujishima et al. . |
| 4,755,656 | 7/1988 | Charlesworth et al. . |
| 5,018,437 | 5/1991 | San Juan ..................... 219/492 |
| 5,044,263 | 9/1991 | Birkert et al. . |
| 5,094,154 | 3/1992 | Nopanen . |
| 5,126,536 | 6/1992 | Devlin . |
| 5,283,421 | 2/1994 | Richards . |
| 5,304,782 | 4/1994 | McNair et al. . |

FOREIGN PATENT DOCUMENTS

| | | |
|---|---|---|
| 548814 | 10/1942 | European Pat. Off. . |
| 568498 | 4/1945 | European Pat. Off. . |
| 600875 | 5/1948 | European Pat. Off. . |
| 649005 | 1/1951 | European Pat. Off. . |
| 1400429 | 7/1975 | European Pat. Off. . |
| 1573012 | 8/1980 | European Pat. Off. . |
| 2624563 | 9/1977 | Germany . |
| 18421 | of 0000 | Taiwan, Prov. of China . |
| 23783 | of 0000 | Taiwan, Prov. of China . |
| 33776 | of 0000 | Taiwan, Prov. of China . |
| 37652 | of 0000 | Taiwan, Prov. of China . |
| 112345 | of 1989 | Taiwan, Prov. of China . |
| 113574 | of 1989 | Taiwan, Prov. of China . |
| 153026 | of 1991 | Taiwan, Prov. of China . |

*Primary Examiner*—Timothy F. Simone
*Attorney, Agent, or Firm*—Kokjer, Kircher, Bowman & Johnson

[57] ABSTRACT

A toaster having an automatic shut-off. The toaster includes a cavity to receive bread and which includes a heating element which may be selectively energized by a switch to cause toasting of the bread. The toaster also includes a carriage mechanism to move the bread between up and down positions. The carriage mechanism includes a bread support extending into the cavity. The bread support is connected to a support frame which rides upon a vertical slide rod. Also mounted upon the slide rod is a lock frame mounted to allow limited movement with respect to the support frame. A spring is connected to the lock frame to bias it into an up position, and the lock frame includes a lock mechanism to releasable maintain it in a down position. The switch for activating the heating elements is activated when the lock frame is in this down position. A release mechanism is provided to release the lock mechanism. In use, the release mechanism will release the lock mechanism, causing the lock frame to travel upward, deactivating the switch for the heating elements. This upward travel of the lock frame is prior to any movement of the support frame, such that the heating elements are deactivated even if the support frame is held in its down position due to jamming or weight of the bread.

10 Claims, 3 Drawing Sheets

TOASTER WITH SAFETY SHUT-OFF

BACKGROUND OF THE INVENTION

1. Field of the Invention

The present invention relates in general to food preparation appliances. In particular, the present invention relates to an improved toaster having a shut-off switch for improved safety.

2. Description of the Related Art

Electric toasters have been commonly employed for numerous years. Such toasters include a housing which defines one or more slots to receive the slice of bread, pastry or other item to be toasted. Located within the slot is a vertically moveable carriage upon which the bread rests, .and a plurality of electrical heating elements which cause the toasting of the bread. In use, the carriage is moved downward to cause the bread to be received with the slots adjacent the heating elements, with the carriage being spring biased upward. At its lowest operative position, the carriage will be releasable locked into position with the physical presence of the carriage causing activation of a switch to energize the heating elements. After a predetermined time and/or temperature the carriage is released from this lowest position, with the spring bias tending to move the carriage upward. This upward movement will disengage the switch to deenergize the heating elements and bring the bread partially out of the slot where it may be manually retrieved by the user.

In actual practice, however, it has been found that the bread will occasionally become jammed when in the lowest position of the carriage, or the bread may have a sufficient weight to overcome the spring biasing force. In either instance, the carriage cannot move upward upon completion of the predetermined time and/or temperature. As the carriage does not move upward, the switch to deenergize the heating elements is not deactivated, and the heating elements remain energized. This may cause excessive heating of the bread, and may even lead to combustion of the bread within the toaster causing a fire hazard.

SUMMARY OF THE INVENTION

An object of the present invention is to provide a toaster having improved safety.

Another object of the present invention is to provide a toaster with an improved shut-off system.

A further object of the present invention is to provide a toaster which will deactivate the heating elements at the desired time, even if the carriage is maintained in the lowest or operative position, such as by a jammed or overweight item upon the carriage.

These and other objects are achieved by a toaster having at least one cavity therein to receive bread for toasting. The cavity includes at least one heating element which may be selectively energized by a switch to cause toasting of the bread. The toaster also includes a carriage-mechanism to move the bread between up and down positions. The carriage mechanism includes a bread support extending into the cavity and supporting the bread therein. The bread support is connected to a support frame which rides upon a vertical slide rod. Also mounted upon the slide rod is a lock frame. The lock frame and support frame are mounted to allow limited movement with respect to each other, and in particular the lock frame may move a predetermined distance vertically lower than the support frame. A spring is connected to the lock frame to bias it into an up position, and the lock frame includes a lock mechanism to releasable maintain it in a down position. The switch for activating the heating elements is arranged such that it is activated when the lock frame is in this down position. A release mechanism is provided to remove the lock frame from the locked down position, such that the spring may bias it upward to the up position. In use, the carriage will be moved manually downward causing the bread to move into the cavity. At a predetermined position the support frame will cease downward movement, while the lock frame continues downward to its down position, where it is releasable locked. This causes activation of the heating element. A release mechanism is activated after a predetermined time and/or temperature to release the lock mechanism. This will cause the lock frame to travel upward from the down position, deactivating the switch for the heating elements. This upward travel of the lock frame is prior to any movement of the support frame, such that the heating elements are deactivated even if the support frame is held in its down position due to jamming or weight of the bread.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
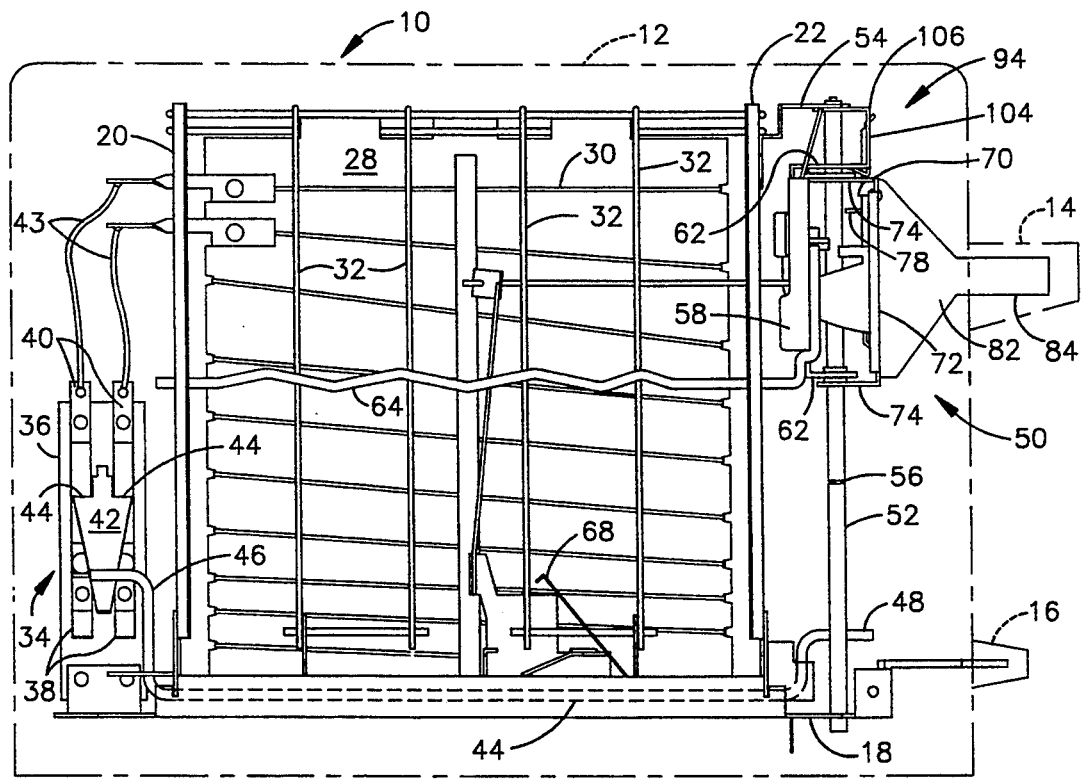
FIG. 1 is a front view of a toaster according to the present invention, in the up position.

With reference to FIG. 1, a toaster according to the present invention is generally designated by reference numeral 10.

The toaster 10 includes a housing 12 (shown in phantom line) which will substantially surround the operative components of the present invention. Upon the exterior of the housing there will be mounted appropriate manual controls, such as an activation grip 14 and darkness control grip 16.

Figure 2:
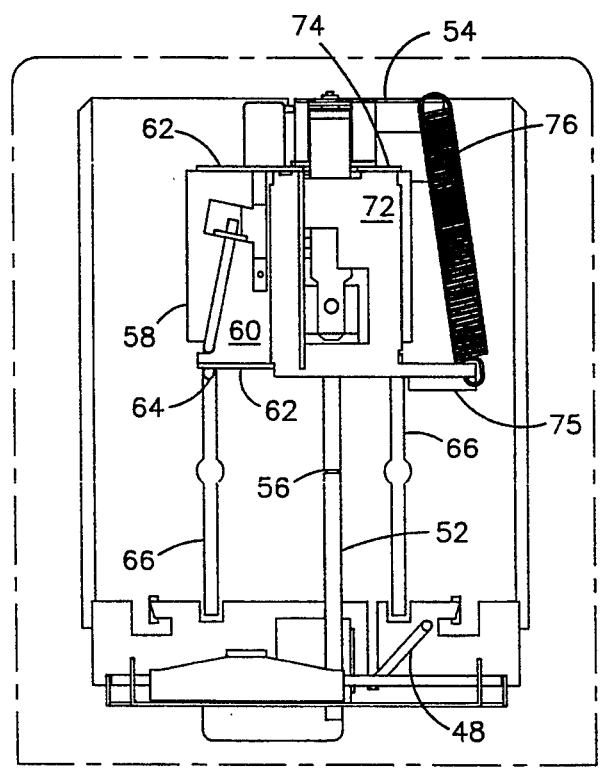
FIG. 2 is a right side view of the toaster of FIG. 1.

The lower portion of the toaster is formed by a bottom frame 18 which is substantially planar and horizontal in use. The bottom frame 18 may include a selectively openable crumb tray to aid in cleaning the interior of the toaster. Simply for the sake of convention, the toaster 10 may be said to define a longitudinal direction within the page in FIG. 1 and extending to the left and right horizontally (parallel to the bottom frame 18), and a lateral direction which is horizontal and into the page in FIG. 1 (horizontal and to the left and right in FIG. 2). The height dimension would of course be within the page and vertically up and down in FIG. 1.

The toaster 10 will include first and second end walls 20 and 22. Each of the end walls is substantially planar, is within a lateral vertical plane and are longitudinally spaced from each other along the bottom frame 18. The bottom ends of the end walls 20 and 22 may be suitable retained to the bottom frame 18. The end walls 20 and 22 will define a portion of the cavity or cavities which receive the bread to be toasted.

Figure 3:
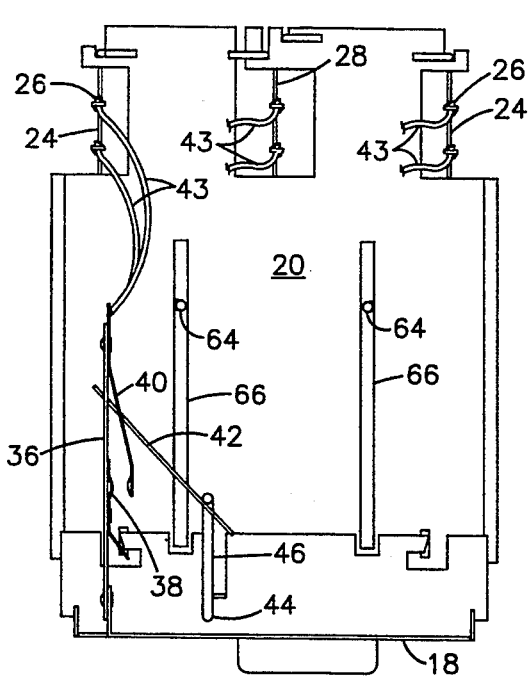
FIG. 3 is a left side view of the toaster of FIG. 1.
Figure 4:
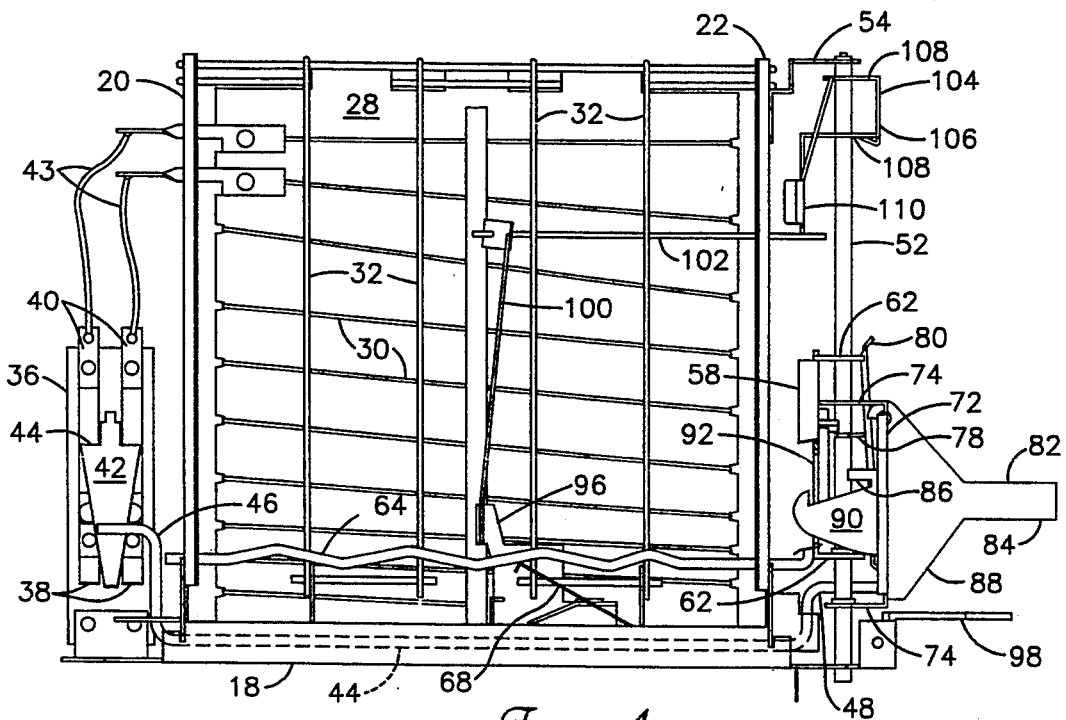
FIG. 4 is a front view of the toaster according to the present invention, in the down position.
Figure 7:
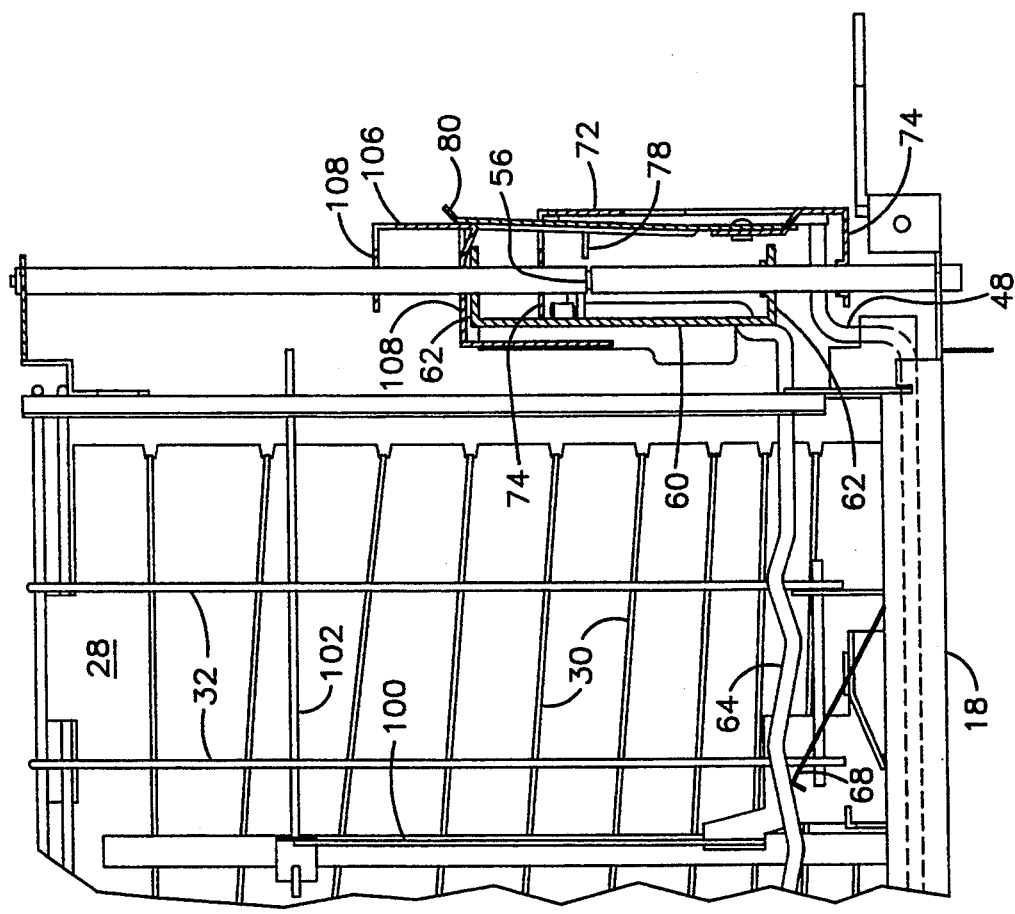
FIG. 7 is a detail front view of the toaster according to the present invention in the down, but released position.

Although removed from FIGS. 1, 4 and 7 for clarity, two side walls 24 will be mounted to the end walls 20, 22 and bottom frame 18, as shown in FIG. 3. Each of the side walls will include an electrical resistance heating element 26 mounted thereon to direct heat laterally inward. The side walls 24, with the end walls, will complete a single cavity for the toaster 10. If further cavities are desired for further slices of bread, there may be disposed one or more center walls 28 between the side walls. The center walls 28 will thus subdivide the area between the side walls 24 creating further cavities. For example, the single center wall 28 shown in FIG. 3 creates two cavities. The center wall 28 will mount a heating element 30 of the electrical resistance type, with the heating element 30 extending along both faces of the center wall to provide heat to each of the cavities formed by the center wall 28. The side walls 24 and center wall 28 are of course formed of a suitable material to withstand the heat of the heating elements 26 and 30. Each of the side walls 24 and center walls 28 will also be provided with a plurality of vertically elongated bread guards 32 spaced laterally outward from the heating elements to prevent contact between the bread and the heating elements.

The toaster 10 also includes means for selectively connecting the heating elements 26 and 30 to a supply of electrical current, with this means being generally designated by reference numeral 34 in FIG. 1. The means 34 includes an electrically insulating base 36 mounted to the bottom frame 18. In the embodiment shown, the base 36 extends vertically upward in a longitudinal plane, although other orientations, including horizontal, may be employed. Fixed to the base 36 in spaced relation are a pair of supply contacts 38 which are connected to the wires of an appropriate electrical cord (not shown) or other source of electrical current.

Figure 6:
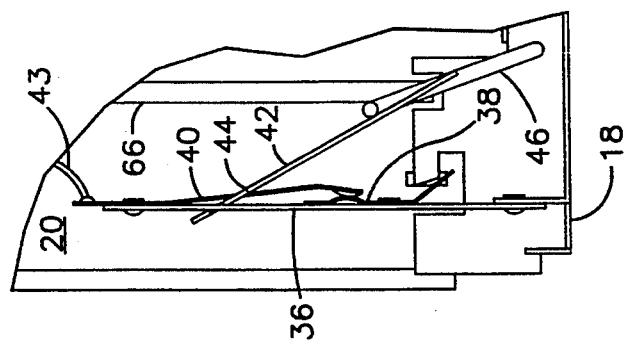
FIG. 6 is a detail left side view of the toaster of FIG. 4.

Also mounted to the base 36 are a pair of spring contacts 40. The spring contacts 40 are formed of a spring metal and are mounted such that in their unbiased condition they are spaced from abutment with the supply contacts 38. As such, in their normal condition the spring contacts 40 do not complete a circuit with the supply contacts 38. Base 36 also pivotally mounts an electrically insulative presser 42 in the form of a substantially rigid plate extending outwardly from the base in a direction similar to that of the spring contacts 40. The presser 42 is pivoted to the base 36, yet includes a pair of shoulders 44 which are in abutment with the spring contacts 40 at a position spaced from their connection to the base 36. As such, pivotal movement of the presser 42 toward the base 36 will cause similar pivotal movement of the spring contacts 40. In particular, pivoting the presser plate in a clock-wise direction from FIG. 3 will cause the spring contacts 40 to also rotate in a clock-wise direction, until both are placed in a configuration as shown in FIG. 6 and a circuit completed. Pivotal movement of the presser 42 in the opposite direction will allow the spring contacts 40 to move back to the configuration of FIG. 3. Note that since the spring contacts are formed of a spring metal, the presser 42 will tend to the position of FIG. 3.

The spring contacts 40 are of to course be operatively connected to the heating elements 26 and 30 via appropriate wiring 43. The contacts, wiring and elements may therefore be selectively placed into a complete circuit configuration to cause resistance heating of the elements.

Movement of the presser 42 and thus the contacts 40 is achieved by the means 34 further including a pivot rod 44. The pivot rod 44 is pivotally mounted to the bottom frame 18 and includes an upstanding contact leg 46 at a first end thereof, and an upstanding carriage leg 48 at a second end thereof. As such, rotation of the pivot rod 44 with respect to the bottom frame 18 will cause the contact and carriage legs 46 and 48 to swing through an arc. The contact leg 46 is located such that during a portion of this arc it is in abutment with the presser 42. As such, rotation of the pivot rod 44 (and in particular the contact leg 46) will cause the presser 42 to be pivoted downward, bringing the spring contacts 40 into abutment with the supply contacts 38. The spring biasing of the spring contacts 40 will preferably be of a sufficient force to cause movement of the presser 42 and the contact leg 46 to the position of FIG. 3 absent any external force.

The toaster 10 according to the present invention also includes a carriage mechanism, generally designated by reference numeral 50 in FIG. 1, which supports the bread to move the bread between an up position accessible by the user and a down position received with the cavity defined by the sidewall, center wall and end walls.

Carriage mechanism 50 is mounted upon a slide rod 52 mounted to the bottom frame 18 and extending substantially vertically upward therefrom. The slide rod 52 is located outside of the cavity to receive the bread, and for stability may be fixed at its upper end to rod strut 54 which is in turn fixed to one of the end walls 20 and 22 (end wall 22 and the embodiments shown). The slide rod 52 has a substantially constant diameter throughout its length, with the exception of a detent 56 formed at a position between the ends of the slide rod. The detent 56 may be formed as a depression in the outer surface of the slide rod 52, and is preferably a circumferential groove about the rod 52.

A first element of the carriage mechanism is a support frame 58. The support frame 58 may take the form of a generally planar support body 60 oriented substantially parallel to the adjacent end wall 20 or 22 (in this case second end wall 22) having a pair of support legs 62, one extending horizontally from each of the top and bottom edges of the support body 60. The support legs 62 include appropriate apertures which receive the slide rod 52 with a sliding fit.

The support frame 58 mounts one or more bread supports 64. The bread supports 64 are elongated elements which extend through guide slots 66 located in each of the first and second end walls 20 and 22. The guide slots are vertically oriented and have a size slightly greater than that of the bread supports 64, such that the guide slots will restrict unwanted lateral movement of the bread supports 64, yet allow them to move vertically up and down with the support frame 58.

As should be apparent, a bread support 64 will extend through each of the cavities intended to receive the bread, with the bread supports having a sufficient width to prevent the bread from falling there past. In the embodiment shown, the single support frame 58 is centrally located in the lateral direction, and supports two bread supports 64, one extending through each of the two cavities. Other arrangements are of course possible.

The vertical movement of the support frame 58 and bread supports 64 will define up and down positions at the vertical extremes. The up position will be described more fully below, but as a general proposition will be at a position such that the smallest anticipated slice of bread used in the toaster will still extend upwardly beyond the housing 12 when the bread supports 64 and support frame 58 are in the up position. Similarly, the down position is intended to permit an average slice of bread to be fully received within the cavity for proper toasting.

Figure 5:
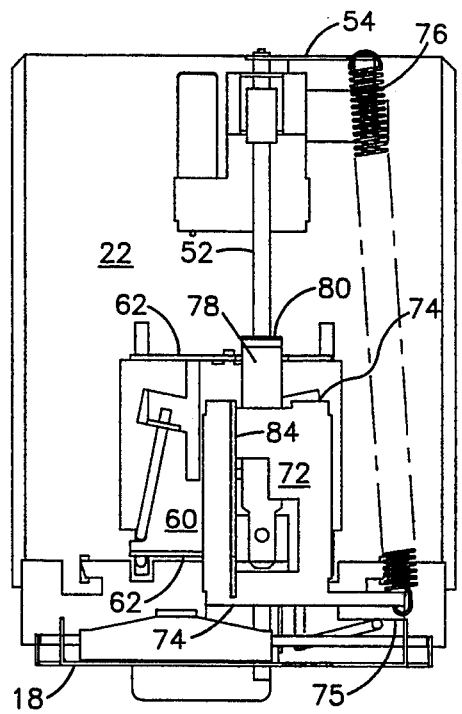
FIG. 5 is a right side view of the toaster of FIG. 4.

To restrict downward movement of the support frame 58 and bread supports 64, and thus define the down position for these elements, there is provided a support stop 68 mounted to the bottom frame 18. In the embodiments shown, the support stop 68 takes the form of a cantilevered element of spring steel having its free end vertically spaced from bottom frame 18 and positioned to contact at least one of the bread supports 64. For reasons made clear below, the support stop 68 is located such that the down position of the support frame 58 will be vertically spaced from the lower end of the slide rod 52, as shown in FIGS. 4, 5, and 7. The carriage mechanism 50 also includes a lock frame 70 for vertical movement along the slide rod 52. In a manner similar to that of the support frame, the lock frame 70 may consist of a generally planar lock body 72 substantially parallel to the associated end wall. The lock body 72 will be supported by a pair of lock legs 74, one extending substantially horizontally outward from each of the top and bottom edges of the lock body 72. Each of the lock legs 74 will include an appropriate aperture slidingly receive the slide rod 52, such that the lock frame 70 may move vertically upon the slide rod.

It is an important aspect of the present invention that a portion of the carriage mechanism be moveable with respect to the remainder of the carriage mechanism. In the embodiment shown, this is effected by allowing the look frame 70 to move with respect to the support frame 58. To permit this movement in the embodiment shown, the support legs 62 and lock legs 74 are located in an alternating arrangement in the vertical direction, As such, the lock frame 70 may be moved to an up position as shown in FIG. 1, with the support legs 62 and lock legs 74 in close proximity. In the down position shown in FIG. 4, however, the lock frame has moved vertically downward with respect to the support frame such that the support legs 62 and lock legs 74 are spaced. In other words, the lock frame has a down position which is vertically lower than that of the support frame.

To maintain the carriage in up position for receipt of bread, and to move the carriage mechanism to the up position upon completion of toasting, there is provided a biasing means in the form of a spring 76 extending between the rod strut 54 and the lock frame 70. In the embodiments shown, with the alternating arrangement of the support legs and lock legs, it may be seen that vertical movement of the lock frame due to biasing of spring 76 will cause the lock legs and support legs to come into abutment, such that continued vertical movement of the lock frame will cause vertical movement of the support frame along with the lock frame.

To releasably maintain the lock frame in its down position (and thus permit the support frame and bread supports to be placed in their down position due to the force of gravity) the carriage mechanism 50 is provided with a releasable lock in the form of a biased pawl 78. The pawl 78 is mounted to the lock body 72 and is positioned such that it will engage with the detente 56 when the lock frame is in its down position, and in particular at a position spaced below that of support frame 58. The biased pawl 78 is biased towards the slide rod 52 such that the pawl 78 will engage with the detente 56 automatically upon contact. The pawl 78 also includes an inclined portion 80 at its vertically upper end for a reason discussed more fully below.

The carriage mechanism 50 also includes an activation handle 82 pivotally mounted to the lock body 72 adjacent the upper ends thereof. The activation handle 82 includes an elongated handle portion 84 which will extend beyond the exterior of the housing 12 and will receive the activation grip 14. This will allow the user to manually push the activation grip downward, thus causing the activation handle 82 and lock frame 70, and the support frame 58 and bread supports 64 to move downward into their respective down positions.

As will be discussed more fully below, the lock frame 70 additionally includes a switch abutment portion 75 the switch abutment portion is oriented and positioned such that when the lock frame 70 is in its down position the abutment portion 75 will have engaged and caused rotation of the carriage leg 48, and thus pivot rod 44.

The lock frame also preferably includes means for manually releasing the carriage mechanism from the down position such that it may be moved upward to the up position by the spring 76. The means for manually releasing may comprise a release finger 86 extending through an appropriate slot (not shown) in the lock body 72 and having a laterally extending portion (not shown) which extends between the slide rod 52 and biased pawl 78. As noted above, the activation handle is preferably pivoted to the lock body 72, with this pivotal connection being at the upper edge of these two elements. This pivotal connection will allow the activation handle 82 to be pivoted in a counter clock-wise direction in FIG. 4 such that the release finger 86 engages the biased pawl 78 to remove it from engagement with the detente 56.

To prevent excessive clock-wise rotation of the activation handle 82 with respect to the lock body 72, and thus permit manual pressure to be applied to the lock frame for moving the carriage mechanism downward, the activation handle 82 may include an abutment portion 88 at its lower end below the extent of the slot through which the release finger extends. As such, the abutment portion 88 may move into contact with the outer face of the lock body 72 to prevent the noted clock-wise rotation.

In a similar manner, it is preferred that the counter clock-wise rotation in FIG. 4 to release the lock frame from its down position also be limited such that the user may apply manual upward pressure to assist in ejecting the bread from the cavities, should this be necessary. Towards this end, the activation handle 82 may include a pivot hook 90 extending through the same slot as that employed for release finger 86 and having an upwardly directed hook at its free end. The pivot hook 90 will extend towards and through a vertically oriented hook slot 92 in the support body 60. The hook slot is positioned such that when the support frame and lock frame are in their respective down positions the pivot hook 90 is freely moveable through the hook slot 92, such that pivotal movement of the activation handle 82 is permitted.

However, when the biased pawl 78 is removed from engagement with detent 56 the lock frame 70 will move upward with respect to the support frame 58. As such, the pivot hook 90 will move upward within the hook slot 92. This upward movement will cause the hook portion of the hook slot to move vertically above the upper end of the hook slot 92, such that counter clockwise movement of the activation handle 82 is prevented due to engagement of the pivot hook 90 with the support body 60. This will allow the user to exert manual upward pressure upon the carriage mechanism 50.

While the above arrangement permits manual disengagement of the carriage mechanism to cause it to move to its up position, it is preferred that there be provided a control mechanism to cause automatic disengagement upon reaching a desired time and/or temperature, as is known in the art. In the embodiments shown, this is effected by a lock release mechanism generally designated by reference numeral 94 in FIG. 1.

The lock release mechanism 94 includes a strip mount 96 mounted to the bottom frame 18. As is known in the art, and as will be more apparent above, this connection of the strip mount 96 to the bottom frame may be resiliently pivotal, with the orientation of the strip mount with respect to the bottom frame being controlled by a darkness control handle 98 in a manner well known in the art. This darkness control handle 98 will extend outward beyond the housing 12 and will mount the darkness control grip 16, noted above.

The strip mount 96 will have fixed thereto a bimetallic strip 100. The free end of the bimetallic strip will have mounted thereto a release pin 102 which extends through the end wall associated with the carriage mechanism (in this embodiment the second end wall 22). The release pin 102 is freely moveable through the end wall such that the position of the free end is dependent upon the position of the free end of the bimetallic strip 100. As is shown in the drawings, the bimetallic strip is mounted within the associated cavity (possibly with a single bimetallic strip for the entire toaster 10) such that the heat of the heating elements will cause the bimetallic strip to bend in a known manner, thus causing a known movement of the free end of release pin 102. As may be envisioned, altering the orientation of the strip mount by use of the darkness control handle will alter the position of the release pin for a given temperature.

The lock release mechanism 94 also includes drop carriage 104. The drop carriage 104 has a general configuration similar to that of the lock frame 70. In particular there is a substantially planar drop body 106 oriented substantially parallel to the associated end wall 22. A pair of drop legs 108 extend horizontally outward, one from each of the top and bottom edges of the drop body 106, with each of the drop legs 108 including an appropriate aperture (not shown) to slidingly receive the slide rod 52. As such, the drop carriage 104 may move freely in a vertical direction along the slide rod 52.

As is shown in FIGS. 1 and 4, the drop carriage 104 is mounted vertically above the support frame 58 and lock frame 70. The drop carriage 104 also includes a pin abutment 110 (best shown in FIG. 4). The release pin 102 and pin abutment 110 are oriented and configured such that the free end of the release pin 102 will extend vertically below and longitudinally further than the pin abutment 110 when the bimetallic strip 100 is in the "cold" position of FIG. 4. As such, the drop carriage 104 will be maintained in its up position as shown in FIG. 4. However, upon activation of the heating elements and generation of a predetermined amount of heat, the bimetallic strip will change position to that shown in FIG. 7, as is known in the art. In this position the free end of the release pin 102 will move longitudinally inward of the pin abutment 110, and will thus cease to support the drop carriage 104.

When this occurs, the drop carriage 104 will fall under the force of gravity to a down position, shown in FIG. 7, abutting upon the support frame 58. As is shown in FIG. 7, the inclined portion 80 of the biased pawl 78 is positioned such that the drop body 106 will contact the inclined portion in this down position of the drop carriage. This contact will serve to pivot the biased pawl 78 out of engagement with the detent 56. As such, the lock frame 70 is not prevented from upward movement, and will begin to move upward under the force of spring 76. As discussed above, the lock frame will move into abutment with the support frame 58, thus drawing the support frame 5S upwards also. Additionally, the drop carriage 104 is in abutment with the support frame 58, and is also drawn upward. This upward movement, in a normal condition, will move the drop carriage 104 and the entire carriage mechanism upward to the original position, thus causing the bread received within the cavity to be moved partially outward thereof to be manually removed by the user, and ready for receipt of a further slice of bread.

As noted above, when the lock frame 70 is in its down position, with the biased pawl 78 engaged with the detente 56, the abutment portion 75 will have engaged and caused rotation of the carriage leg 48, and thus pivot rod 44. This rotation of the pivot rod 44 will cause the contact leg 46 to engage and move the pressor 42 to cause activation of the means 34 selectively connecting the heating elements to the current source. As such, when the lock frame 70 is in its down position the heating elements are connected to the source of a electrical current, but as the lock frame 70 moves upward, the pivot rod 44 will rotate in the opposite direction breaking the circuit between the heating elements and current source.

The various components are dimensioned and oriented such that the amount of upward vertical movement of the lock frame (upon being released from the down position) which is required to allow the pivot rod 44 to rotate and break the circuit is less than or equal to the amount of vertical movement permitted by the support frame in its down position. As such, even if the support frame were locked in its down position (such as would occur if a piece of bread were jammed within the cavity, preventing upward movement of the support frame 58), the upward movement of the lock frame with respect to the support frame will still allow sufficient pivoting of the pivot rod 44 to break the circuit between the heating elements and the current source. As such, even if the bread is lodged within the cavity, the heating elements will be disengaged at the normal time, thus preventing excessive heating and possible combustion of the bread.

This feature is available whether the lock frame is released by the drop carriage 104 or by manual actuation of the activation handle 82.

While the above invention has been described with regard to a particular embodiment, this should be apparent to those skilled in the art that various modifications are possible. For example, while the lock frame has been shown as vertically below the support frame in their respective down positions, this is not strictly necessary. All that is required is that a switch abutment portion move with respect to the remainder of the carriage mechanism, and that the switch abutment portion be responsible for the actuation of the means to connect the heating elements to the current source.

As a further example, the switch abutment portion could be an element separate from the carriage mechanism and mounted for movement on the end wall adjacent the path of travel of the carriage and adjacent the switch (or portion of the switch rod). Movement of the carriage to the down position could cause movement of the switch abutment from its first to its second position, causing activation of the switch. The release mechanism could release not only the carriage, but also the switch abutment portion, allowing it to be biased (perhaps by its own separate spring) to its first position, thus deactivating the switch, regardless of movement of the carriage. Other arrangement are of course possible.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A toaster with automatic shut-off, comprising;
    a bottom frame and at least one wall, together defining an open-ended cavity adapted to receive an item to be toasted, said wall mounting at least one heating element;
    a switch mounted to said bottom frame and connected to said heating element for selective activation of said heating element;
    a carriage mechanism mounted to said bottom frame, said carriage mechanism including:
        a bread support extending into said cavity and adapted to support the item to be toasted, said bread support movable between an up and a down position;
        a switch abutment portion movable between an up and a down position, said portion activating said switch when said portion is in said down position, said portion being movable with respect to said bread support through a limited degree of travel when said bread support is in said down position, with movement of said portion through said limited degree of travel from said down position being sufficient to deactivate said switch;
    means for releasably locking said portion in said down position; and
    means biasing said portion toward said up position and through said limited degree of travel; and
    means permitting release of said locking means, whereby release of said locking means permits said biasing means to cause motion of said portion with respect to said bread support, deactivating said switch even when said bread support remains in said down position.

2. A toaster as in claim 1, further including a slide rod mounted to said base frame and extending in a direction between said up and said down positions, and wherein:
    said bread support is mounted for sliding movement upon said slide rod;
    said portion comprises a lock frame mounted for sliding movement upon said slide rod, and includes said means for releasably locking.

3. A toaster as in claim 2, wherein, upon completion of said limited degree of travel from said up position, said lock frame abuts against said bread support, and thus said biasing means urges said bread support toward said up position.

4. A toaster as in claim 2, wherein said means permitting release of said locking means include a temperature sensitive element and releases said locking means upon a predetermined temperature.

5. A toaster with automatic shut-off, comprising;
    a bottom frame and at least the wall, together defining an open-ended cavity adapted to receive an item to be toasted, said wall mounting at least one heating element;
    a switch mounted to said bottom frame and connected to said heating element for selective activation of said heating element;
    a bread support extending into said cavity and adapted to support the item to be toasted, said bread support movable between an up and a down position;
    switch abutment means mounted for movement between a first position engaging said switch and thus energizing said heating element and a second position disengaging said switch and thus deenergizing said heating element, said switch abutment means being mounted for movement between said first and second positions independent of said bread support;
    means for releasably locking said switch abutment means in said first position;
    means biasing said switch abutment portion toward said second position; and
    means permitting release of said locking means, whereby release of said locking means permits said biasing means to cause motion of said switch abutment portion with respect to said bread support, deactivating said switch even when said bread support remains in said down position.

6. A toaster as in claim 5, further including a slide rod mounted to said base frame and extending in a direction between said up and said down positions, and wherein:
    said bread support is mounted for sliding movement upon said slide rod;
    said switch abutment portion comprises a lock frame mounted for sliding movement upon said slide rod, and includes said means for releasably locking.

7. A toaster as in claim 6, wherein, upon completion of movement from said first to said second position said lock frame abuts against said bread support, and thus said biasing means urges said bread support toward said up position.

8. A toaster as in claim 5, wherein said means permitting release of said locking means include a temperature sensitive element and releases said locking means upon a predetermined temperature.

9. A toaster with automatic shut-off, comprising:

a bottom frame and at least one wall, together defining an open-ended cavity adapted to receive an item to be toasted, said wall mounting at least one heating element;

a switch mounted to said bottom frame and connected to said heating element for selective activation of said heating element;

a slide rod mounted to said bottom frame;

a support frame mounted to said slide rod for movement between an up position and a down position;

a bread support mounted upon said support frame and extending into said cavity to support the item to be toasted;

a lock frame mounted on said slide rod for movement between an up position and a down position, said lock frame having limited freedom of movement with respect to said support frame at least when said lock frame and said support frame are in said respective down positions, said lock frame in said down position activating said switch, said lock frame disengaging said switch upon movement through said limited movement with respect to said support frame in said down position and in a direction toward said up position;

a releasable lock mechanism mounted upon said lock frame for releasably fixing said lock frame with respect to said slide rod when said lock frame is in said down position;

a spring mounted between said bottom frame and said lock rod to bias said lock frame to said first position, said limited movement with respect to said support frame ending with abutment of said lock frame and support frame, and thus biasing of said support frame via said spring; and a lock release mechanism permitting release of said lock mechanism, whereby said lock frame will travel through said limited movement to disengage said switch despite said support frame remaining in said down position.

10. A toaster as in claim 9, wherein said lock release mechanism include a temperature sensitive element.

* * * * *